(12) United States Patent
Ji

(10) Patent No.: US 10,666,586 B2
(45) Date of Patent: *May 26, 2020

(54) DEVICE AND METHOD FOR DISPLAYING IMAGE IN CHATTING AREA AND SERVER FOR MANAGING CHATTING DATA

(71) Applicant: KAKAO CORP., Jeju-si, Jeju-do (KR)

(72) Inventor: Joo Hyun Ji, Seongnam-si (KR)

(73) Assignee: KAKAO CORP., Jeju-si, Jeju-Do (KR)

( * ) Notice: Subject to any disclaimer, the term of this patent is extended or adjusted under 35 U.S.C. 154(b) by 128 days.

This patent is subject to a terminal disclaimer.

(21) Appl. No.: 15/811,833

(22) Filed: Nov. 14, 2017

(65) Prior Publication Data

US 2018/0069814 A1 Mar. 8, 2018

Related U.S. Application Data

(63) Continuation of application No. 14/437,005, filed as application No. PCT/KR2013/009392 on Oct. 21, 2013, now Pat. No. 9,847,955.

(30) Foreign Application Priority Data

Oct. 22, 2012 (KR) ........................ 10-2012-0117286

(51) Int. Cl.
*G06F 3/048* (2013.01)
*H04L 12/58* (2006.01)
(Continued)

(52) U.S. Cl.
CPC .......... *H04L 51/046* (2013.01); *G06F 3/0482* (2013.01); *G06F 3/0488* (2013.01);
(Continued)

(58) Field of Classification Search
CPC ....... G06F 9/451; G06F 3/0488; G06F 17/241
See application file for complete search history.

(56) References Cited

U.S. PATENT DOCUMENTS

2005/0223078 A1* 10/2005 Sato ..................... G06Q 10/107
709/207
2008/0132226 A1* 6/2008 Carnall ................... H04L 63/30
455/425

(Continued)

FOREIGN PATENT DOCUMENTS

JP 2001117849 A 4/2001
JP 2012509641 A 4/2012

(Continued)

OTHER PUBLICATIONS

"3 minutes LifeHacking: Method of "modifying" message in Skype—ITmedia enterprise", [online]. Apr. 17, 2008, <URL: http://web.itmedia.co.jp/bizid/articles/0804/17/news017.html>.

(Continued)

*Primary Examiner* — David E Choi
(74) *Attorney, Agent, or Firm* — Hamre, Schumann, Mueller & Larson, P.C.

(57) ABSTRACT

There is provided a device that displays an image in a chatting area where a text is displayed. The device includes a data communication unit that receives a text from an external device via a network; a text display unit that displays the received text in the chatting area; an image search unit that searches for image data of an image selected through a user interface; a position detection unit that detects position information of a region selected through the user interface in the chatting area; and an image display unit that displays the searched image data in a region corresponding to the detected position information. Further, when the displayed text is shifted in the chatting area, the displayed image data are also shifted in the chatting area.

17 Claims, 12 Drawing Sheets

(51) Int. Cl.
*G06F 9/451* (2018.01)
*G06F 3/0488* (2013.01)
*G06Q 10/10* (2012.01)
*G06F 40/169* (2020.01)
*G06F 3/0482* (2013.01)
*G06F 3/0484* (2013.01)

(52) U.S. Cl.
CPC .......... *G06F 3/04845* (2013.01); *G06F 9/451* (2018.02); *G06F 40/169* (2020.01); *G06Q 10/10* (2013.01); *H04L 51/04* (2013.01)

(56) References Cited

U.S. PATENT DOCUMENTS

| | | | |
|---|---|---|---|
| 2008/0182566 A1* | 7/2008 | Camp, Jr. | H04L 51/38 455/418 |
| 2008/0273796 A1* | 11/2008 | Kansal | G06K 9/325 382/176 |
| 2009/0019117 A1* | 1/2009 | Bonforte | G06Q 10/107 709/206 |
| 2009/0094555 A1* | 4/2009 | Viitala | H04M 1/72544 715/838 |
| 2010/0105362 A1* | 4/2010 | Yang | G06F 3/0481 455/414.1 |
| 2010/0185949 A1* | 7/2010 | Jaeger | G06F 3/0481 715/730 |
| 2010/0304766 A1* | 12/2010 | Goyal | H04L 51/34 455/466 |
| 2013/0080928 A1* | 3/2013 | Zhuang | H04L 12/1822 715/758 |
| 2013/0339983 A1* | 12/2013 | Dai | H04M 1/72569 719/318 |
| 2015/0281145 A1* | 10/2015 | Ji | G06Q 10/10 715/758 |

FOREIGN PATENT DOCUMENTS

| | | |
|---|---|---|
| KR | 10-2004-0046272 A | 6/2004 |
| KR | 10-2007-0112515 A | 11/2007 |
| KR | 10-2011-0037040 A | 4/2011 |
| WO | 2008059594 A1 | 5/2008 |

OTHER PUBLICATIONS

Shigeko Takahashi, Line Startbook, Hidekazu system Co., Ltd., Oct. 5, 2012, pp. 44, 47 and 96-97.
International Search Report from International Application No. PCT/KR2013/009392 dated Nov. 28, 2013.
Non-final Office Action dated May 16, 2017 for U.S. Appl. No. 14/437,005, 27 pages.

* cited by examiner

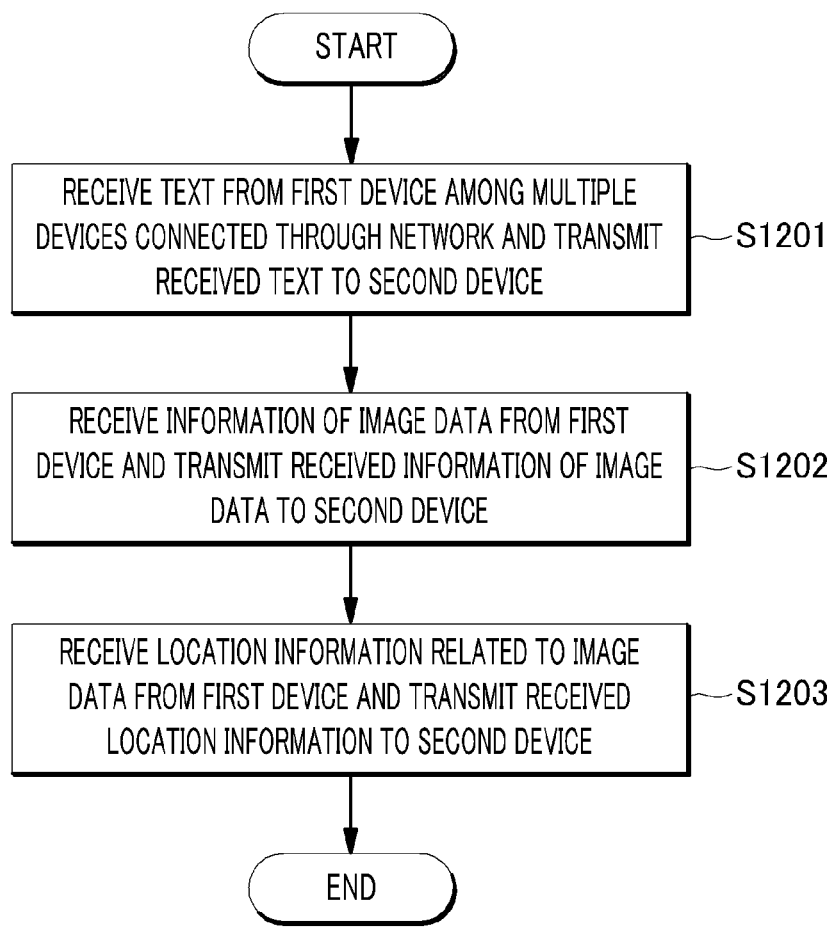

DEVICE AND METHOD FOR DISPLAYING IMAGE IN CHATTING AREA AND SERVER FOR MANAGING CHATTING DATA

CROSS-REFERENCE TO RELATED APPLICATION

This is a continuation application of U.S. patent application Ser. No. 14/437,005, filed on Apr. 20, 2015 which claims the benefit of Korean Patent Application No. 10-2012-0117286, filed on Oct. 22, 2012, the entire disclosures of which are incorporated herein by reference.

TECHNICAL FIELD

The embodiments described herein pertain generally to a device and method for displaying an image in a chatting area where a text is displayed, and a server for managing chatting data.

BACKGROUND

IMS (Instant Message Service) refers to a real-time online communication service that enables a message transmitted from a sender to instantly appear on the screen of a device of a receiver without using an e-mail program or a web browser. In particular, a service for providing chatting and voice and video calls through a mobile network is referred to as MIM (Mobile Instant Messenger) service.

The term "emoticon" is a portmanteau word derived from "emotion" that means a feeling and an icon, and refers to a specific pictorial symbol used for expressing a user's a feeling or an opinion in cyberspace. Such emoticons started from an image symbolizing a smiley face, and have been diversified in kind and form including from facial expressions showing the other party's feelings when exchanging online chatting messages or emails, to feelings, jobs, characters, and animals.

In recent years, an emoticon service that enables users to express their feelings using emoticons has been provided to the users in the IMS or the MIM service. However, the currently provided emoticon service is limited to a simple configuration in which if a selection of a certain emoticon is received from a user, the emoticon is displayed in a region predetermined as a default.

DISCLOSURE OF THE INVENTION

Problems to be Solved by the Invention

There is provided a device and method for displaying an image that enables a user to display an image in any region the user wants when the user displays the image within a chatting area where a text is displayed. Further, there is provided a device and method for displaying an image that induces the user to participate in and use the service by giving the user the authority to control, for example, deletion or shift of an image displayed in the chatting area. However, problems to be solved by the present exemplary embodiment are not limited to the above-described problems, and there may be other problems to be solved.

Means for Solving the Problems

In one exemplary embodiment, there may be provided a device that displays an image in a chatting area where a text is displayed. The device includes: a data communication unit that receives a text from an external device via a network; a text display unit that displays the received text in the chatting area; an image search unit that searches for image data of an image selected through a user interface; a position detection unit that detects position information of a region selected through the user interface in the chatting area; and an image display unit that displays the searched image data in a region corresponding to the detected position information. Further, when the displayed text is shifted in the chatting area, the displayed image data are also shifted in the chatting area.

In another exemplary embodiment, there may be provided a device including: a data communication unit that receives a text from an external device via a network; a text display unit that displays the received text in a chatting area; an image search unit that searches for image data of an image selected through a user interface; a position detection unit that detects position information of a region selected through the user interface in the chatting area; an image display unit that displays the searched image data in a region corresponding to the detected position information; and an image deletion unit that non-displays the displayed image when a the region where the image data are displayed is selected through the user interface, wherein when the displayed text is shifted within the chatting area, the displayed image data are also shifted within the chatting area.

In yet another exemplary embodiment, there may be provided a method for displaying an image in a chatting area where a text is displayed. The method includes: receiving a text from an external device via a network; displaying the received text in the chatting area; searching for image data of an image selected through a user interface; detecting position information of a region selected through a user interface in the chatting area; displaying the searched image data in a region corresponding to the detected position information; and shifting the displayed image data in the chatting area when the displayed text is shifted in the chatting area.

In still another exemplary embodiment, there may be provided a device including a data communication unit that receives a text, image data, and position information from an external device via a network; a text display unit that displays the received text in a chatting area; and an image display unit that displays the received image data in a region corresponding to the received position information, wherein when the displayed text is shifted within the chatting area, the displayed image data are also shifted within the chatting area.

In still another exemplary embodiment, there may be provided a server that manages chatting data. The server includes: a text management unit that receives a text from a first device and transmits the received text to a second device from among multiple devices connected via a network; an image data management unit that receives information of the image data from the first device and transmits the received information of the image data to the second device; and a position information management unit that receives position information related to the image data from the first device and transmits the received position information to the second device. Further, the image data are displayed in a region corresponding to the position information in the chatting area of the second device.

Effects of the Invention

It is possible to provide a device and method for displaying a sticker-type image that enables a user to display an image in any region the user wants by detecting position information of a certain region selected through a user interface and displaying image data in a region corresponding to the detected position information. It is possible to provide a device and method for displaying an image that induces a user to participate in and use a service by giving the user the authority to control, for example, deletion or shift of an image displayed in a chatting area.

BRIEF DESCRIPTION OF THE DRAWINGS

FIG. 12 is a flowchart of a method for managing chatting data according to an exemplary embodiment of the present disclosure.

MODE FOR CARRYING OUT THE INVENTION

Figure 1:
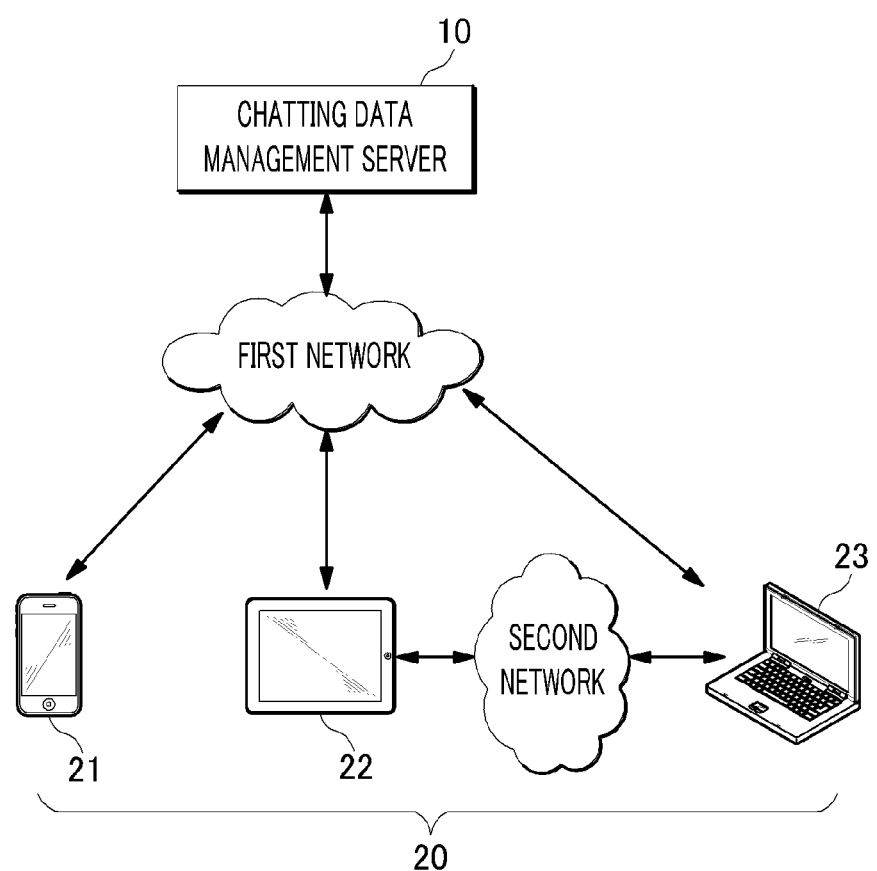
FIG. 1 is a configuration view of a chatting service providing system according to an exemplary embodiment of the present disclosure.

Hereinafter, embodiments of the present disclosure will be described in detail with reference to the accompanying drawings so that the present disclosure may be readily implemented by those skilled in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element. Further, the term "comprises or includes" and/or "comprising or including" used in the document means that one or more other components, steps, operation and/or existence or addition of elements are not excluded in addition to the described components, steps, operation and/or elements unless context dictates otherwise.

FIG. 1 is a configuration view of a chatting service providing system according to an exemplary embodiment of the present disclosure. Referring to FIG. 1, the chatting service providing system includes a chatting data management server 10 and devices 21 to 23. However, the chatting service providing system illustrated in FIG. 1 is one exemplary embodiment of the present disclosure, and, thus, the present disclosure is not limited to FIG. 1. That is, according to various exemplary embodiments of the present disclosure, the chatting service providing system may have different configurations from the configuration illustrated in FIG. 1. By way of example, the chatting service providing system according to an exemplary embodiment of the present disclosure may further include a payment server (not illustrated) that performs a payment process with respect to the devices 21 to 23.

The components of the chatting service providing system illustrated in FIG. 1 are typically connected to each other via a network. The network refers to a connection structure that enables information exchange between nodes such as terminals and servers. Examples of the network may include 3GPP (3rd Generation Partnership Project) network, LTE (Long Term Evolution) network, WIMAX (World Interoperability for Microwave Access) network, Internet, LAN (Local Area Network), Wireless LAN (Wireless Local Area Network), WAN (Wide Area Network), PAN (Personal Area Network), Bluetooth network, satellite broadcasting network, analog broadcasting network, DMB (Digital Multimedia Broadcasting) network, and the like, but may not be limited thereto.

Referring to FIG. 1, a first network that connects the chatting data management server 10 with the devices 21 to 23 and a second network that connects the device 22 with the device 23 may be of different types. By way of example, the first network may be a broadband network and the second network may be a local area network. Herein, an example of the broadband network may be a LTE network and an example of the local area network may be a Wireless LAN.

According to an exemplary embodiment of the present disclosure, the chatting data management server 10 may receive chatting data from any one of the multiple devices 21 to 23 and transmit the received chatting data to another one of the multiple devices 21 to 23. Herein, the chatting data management server 10 may receive the chatting data and transmit the received chatting data via the first network. The chatting data may include at least one of a text, image data, and position information related to the image data.

According to another exemplary embodiment of the present disclosure, the chatting data management server 10 may receive information (for example, selection information or identification information) related to chatting data from the multiple devices 21 to 23 and transmit chatting data corresponding to the received information to the multiple devices 21 to 23. By way of example, the chatting data management server 10 may receive identification information of image data A from the device 21 and transmit the image data A to the device 21 on the basis of the received identification information.

According to another exemplary embodiment of the present disclosure, the chatting data management server 10 may receive information (for example, selection information or identification information) related to chatting data from one of the multiple devices 21 to 23 and transmit the received information to another one of the multiple devices 21 to 23. Then, if another one of the multiple devices 21 to 23 requests chatting data through the information related to chatting data, the chatting data management server 10 may transmit the chatting data to the another one of the multiple devices 21 to 23. By way of example, the chatting data management server 10 may receive identification information of image data A from the device 21 and deliver the received identification information to the device 22, and if the device 22 requests the image data A through the identification information of the image data A, the chatting data management server 10 may transmit the image data A to the device 22. As such, the chatting data management server 10 relays information (for example, selection information or identification information) related to chatting data among the devices 21 to 23, and if each device directly requests chatting data, the chatting data management server 10 transmits the chatting data to each device.

According to yet another exemplary embodiment of the present disclosure, chatting data may be directly transmitted from the device 22 to the device 23. In other words, chatting data may be directly transmitted between the device 22 and the device 23 via the second network that connects the device 22 with the device 23 without passing through the chatting data management server 10.

Each of the devices 21 to 23 displays a text and image data input through a user interface in a chatting area of a display provided in the device. Herein, each of the devices 21 to 23 may display image data in a region corresponding to a certain location selected from the chatting area through the user interface. Thus, each of the devices 21 to 23 can display the image data in any region which a user of each of the devices 21 to 23 wants. Herein, an example of the image data may include sticker-type image data.

Each of the devices 21 to 23 displays a text and image data delivered from another device in real time in the chatting area. Herein, each of the devices 21 to 23 further receives position information of the image data from the another device, and displays the image data in a region corresponding to the received position information in the chatting area. Thus, each of the devices 21 to 23 can display an image in any region which a user of each of the devices 21 to 23 wants or another user of another device wants.

If a control command about image data displayed in the chatting area is input through the user interface or from another device, each of the devices 21 to 23 controls the displayed image data. By way of example, if a shift command as a control command is input, each of the devices 21 to 23 may shift the displayed image data. Further, by way of example, if a selection (for example, a click or a touch) of the displayed image is input, each of the devices 21 to 23 may non-display the displayed image data. As such, each of the devices 21 to 23 can induce a user of a real-time chatting to participate in and use a service by giving the user the authority to control, for example, deletion or shift of an image displayed in the chatting area.

According to various exemplary embodiments of the present disclosure, the devices 21 to 23 may be of various forms. By way of example, the devices may be a TV apparatus, a computer, or a portable terminal which can be connected to a remote server via a network. Herein, examples of the TV apparatus may include a smart TV and an IPTV set-top box, examples of the computer may include a notebook, a desktop, and a laptop equipped with a WEB browser, and examples of the portable terminal may include a portable wireless communication device that ensures portability and mobility and includes any kind of handheld-based wireless communication device such as PCS (Personal Communication System), GSM (Global System for Mobile communications), PDC (Personal Digital Cellular), PHS (Personal Handyphone System), PDA (Personal Digital Assistant), IMT (International Mobile Telecommunication)-2000, CDMA (Code Division Multiple Access)-2000, W-CDMA (W-Code Division Multiple Access), Wibro (Wireless Broadband Internet) terminal, smart phone, tablet PC, or the like.

Hereinafter, operations of the respective components included in the chatting service providing system illustrated in FIG. 1 will be described in more detail.

Figure 2:
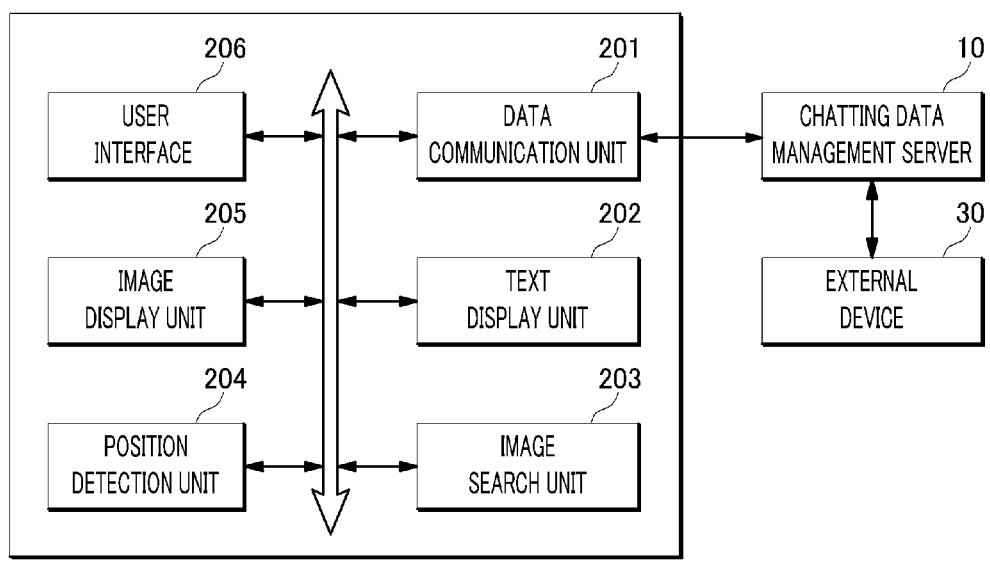
FIG. 2 is a configuration view of a device 20 according to an exemplary embodiment of the present disclosure.

FIG. 2 is a configuration view of a device 20 according to an exemplary embodiment of the present disclosure. The device 20 may be any one of the devices 21 to 23 illustrated in FIG. 1, but may not be limited to the devices 21 to 23 illustrated in FIG. 1.

Referring to FIG. 2, the device 20 includes a data communication unit 201, a text display unit 202, an image search unit 203, a position detection unit 204, an image display unit 205, and a user interface 206. However, the device 20 illustrated in FIG. 2 is one exemplary embodiment of the present disclosure and can be modified or changed in various ways on the basis of the components illustrated in FIG. 2. By way of example, the device 20 may further include an audio output device that outputs audio and a display that outputs video.

The data communication unit 201 receives chatting data of an external device 30 via a network. Herein, the data communication unit 201 may receive chatting data from the chatting data management server 10. Generally, the chatting data may include at least one of a text, image data, and position information related to the image data. Further, the data communication unit 201 may transmit chatting data to the external device 30 connected via the network. Generally, the external device 30 may be any one of the devices 21 to 23 illustrated in FIG. 1, but may not be limited to the devices 21 to 23 illustrated in FIG. 1.

The data communication unit 201 receives chatting data from the chatting data management server 10. Herein, the chatting data management server 10 receives information (for example, identification information or selection information) related to chatting data toward the device 20 as a destination from the external device 30 and transmits chatting data to the data communication unit 201 using the received information.

The data communication unit 201 may receive identification information related to chatting data from the chatting data management server 10 and receive chatting data from the chatting data management server 10 through the received identification information. Herein, the identification information related to chatting data is transmitted from the external device 30 to the chatting data management server 10. That is, the chatting data management server 10 transmits and receives only identification information related to chatting data to/from the devices while storing chatting data therein, and if a certain device requests chatting data through identification information, the chatting data management server 10 may transmit the requested chatting data to the device.

Otherwise, the data communication unit 201 may directly transmit and receive chatting data to/from the external device 30 without passing through the chatting data management server 10.

The text display unit 202 displays a text in a chatting area. Herein, the text may be a text received from the external device 30 or a text input through the user interface 206. The chatting area is an area displayed on a display of the device 20 as a graphic area for displaying a text input through the user interface 206 or received from the external device 30.

Figure 3:
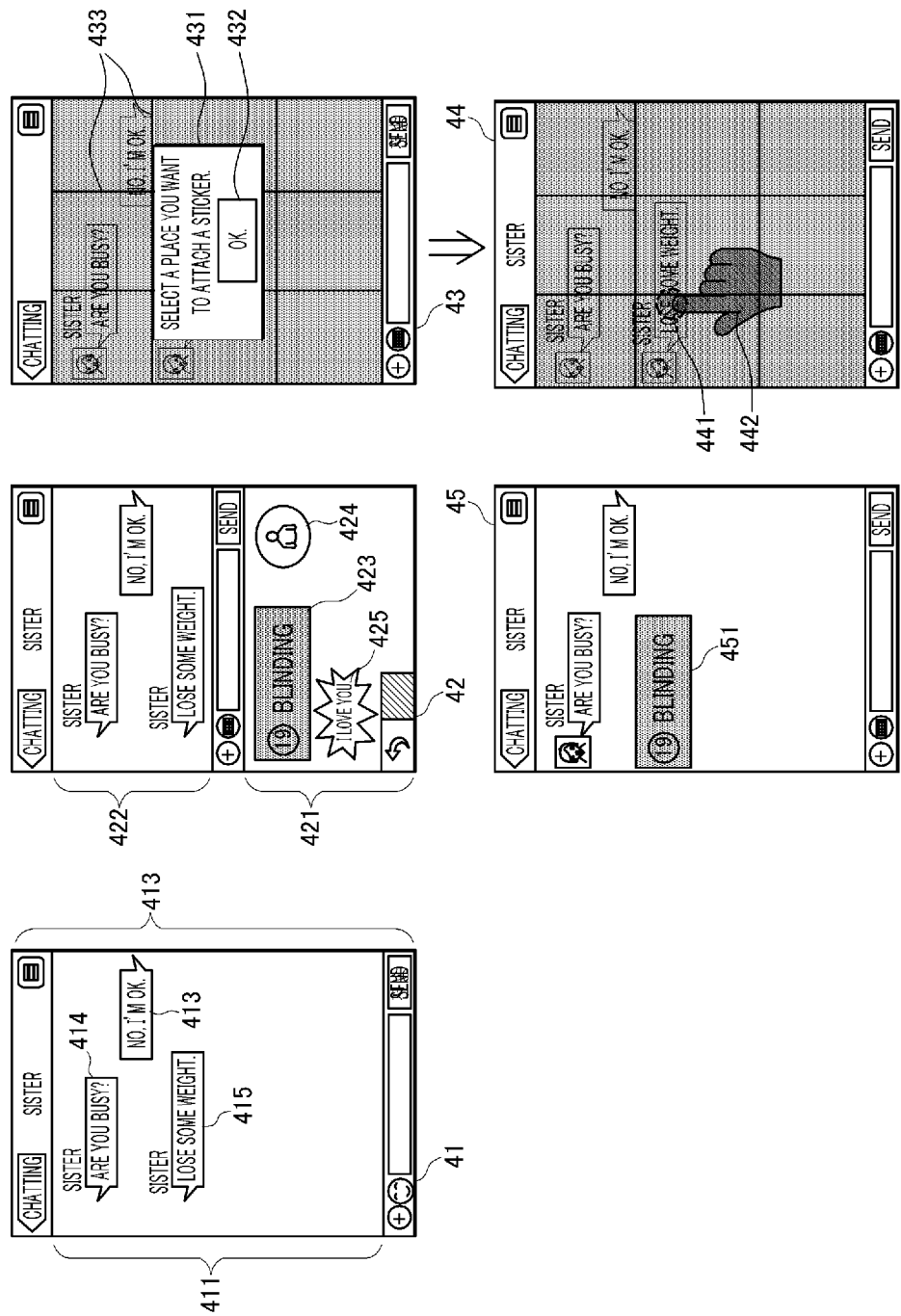
FIG. 3 is a diagram provided to explain an example of an operation of the device 20 of FIG. 2.

FIG. 3 is a diagram provided to explain an example of an operation of the device 20 of FIG. 2. Referring to a reference numeral 41 of FIG. 3, the text display unit 202 may display a text "No. I'm OK." 413 input through the user interface 206 or a text "Are you busy?" 414 or "Lose some weight." 415 received from the external device 30 in a chatting area 412 displayed on a display 411 of the device 20. Herein, the texts "No, I'm OK." 413, "Are you busy?" 414, and "Lose some weight." 415 may be respectively displayed in text bubbles as shown in the reference numeral 41.

The image search unit 203 searches for image data of an image selected through the user interface 206. To be specific, if the image display unit 205 receives a command to call images through the user interface 206 and displays multiple images in a predetermined region of the display of the device 20, the image search unit 203 may search for image data of an image selected through the user interface 206 from the displayed multiple images. Herein, the multiple images may be arranged in used order. By way of example, a first image most recently used among the multiple images may be displayed in a first line and first row of an image list as compared with the other images. In order to do so, the user interface 206 may provide the user with a list of the multiple images arranged in used order.

The image search unit 203 searches for information (for example, identification information or selection information) of the image data of the image selected through the user interface 206. In this case, the device 20 stores the information of the image data therein, and may receive image data corresponding to the information from the chatting data management server 10 if necessary.

According to an exemplary embodiment of the present disclosure, the selected image may be a first-type image. Generally, the first-type image refers to an image which is displayed in a region corresponding to detected position information. The first-type image is different from a second-type image which is displayed in a region determined by a default value. Herein, an example of the first-type image may be sticker-type image, and an example of the second-type image may be an emoticon-type image. The sticker-type image is displayed in a region selected through the user interface 206, and, thus, can be displayed in any region the user wants. Meanwhile, the emoticon-type image can be displayed only in a region determined by a default value.

The first-type image is displayed by the image display unit 205 in a region corresponding to detected position information. The second-type image is displayed by the image display unit 205 in a region determined by a default value. Examples of the region determined by a default value may include a region in a predetermined distance range from a region where a latest text is displayed, a left or right region of the region where a latest text is displayed, or a region to be reduced or enlarged around the region where a latest text is displayed.

Referring to a reference numeral 42 of FIG. 3, the image search unit 203 searches for image data of an image 423 selected through the user interface among multiple images. As illustrated in FIG. 3, the multiple images 423 to 425 are displayed in a region 421 which is activated in response to a call command input through the user interface 206. When the region 421 is activated, a chatting area is changed from the area 411 to an area 422. The image 423 is the most currently used image among the multiple images 423 to 425, and may be displayed in the uppermost line and most left row as compared with the other images 424 and 425.

The image search unit 203 searches for image data from a database (not illustrated). Herein, the database (not illustrated) stores image data input through the user interface 206 and image data input from the external device 30. However, the database (not illustrated) stores information of the image data, and the image search unit 203 may receive image data corresponding to the information from the chatting data management server 10 if necessary. Further, the database (not illustrated) may store texts and position information in addition to the image data. Examples of the database (not illustrated) may include a hard disc drive, a ROM (Read Only Memory), a RAM (Random Access Memory), a flash memory, and a memory card present inside or outside the device 20.

The user of the device 20 selects a region for displaying an image through the user interface 206. By way of example, the user may select a region by placing his/her finger in a predetermined point region in the chatting area through a touch screen interface as the user interface 206. In this case, the point region may be specified by a pixel or at least two pixels. Further, by way of example, the user may select a region by moving his/her finger to specify a predetermined plane region formed into a circle, a triangle, or a square through the touch screen interface as the user interface 206. In this case, the plane region may be specified by a pixel or at least two pixels.

As illustrated in a reference numeral 43 of FIG. 3, the image display unit 205 may display a notice message 431 such as "Select a place you want to attach a sticker." to instruct the user to select a region in the display of the device 20, and if "OK." 432 is selected through the user interface 206, the notice message 431 may be non-displayed.

The position detection unit 204 detects position information of the region selected through the user interface 206 in the chatting area. Herein, the position information may be coordinate information for specifying the selected region. By way of example, the position information may be coordination information of at least one pixel in the region selected through the user interface 206. Such coordinate information may be an identification number for specifying each of multiple pixels by a single value, 2D coordinates including an x-axis location and a y-axis location, or 3D coordinates including x-axis, y-axis, and z-axis locations.

The selected region may be any one cell region selected through the user interface 206 among at least two cell regions divided by at least one dividing line. Herein, the chatting area is divided into at least two cell regions by at least one dividing line. The position detection unit 204 may detect position information of the selected cell region. The position information may be coordination information. The coordinate information may be an identification number for specifying each of multiple cells by a single value, 2D coordinates including an x-axis location and a y-axis location, or 3D coordinates including x-axis, y-axis, and z-axis locations. The image display unit 205 may display at least one dividing line that divides at least two cells in the chatting area. Referring to reference numerals 43 and 44 of FIG. 3, the image display unit 205 may display at least one dividing line 433 that divide at least two cells in the chatting area.

A region selected to display an image may be overlapped with a region where a text is displayed in whole or in part. In other words, the image displayed in the region selected through the user interface 206 can cover the region where the text is displayed in whole or in part.

If a region to be selected through the user interface is in a predetermined distance range from a text already displayed in the chatting area, the already displayed text may be emphasized by the text display unit 202. By way of example, if a region to be selected is in a predetermined distance range from a text already displayed in the chatting area, the text display unit 202 may regularly make flicker of the already displayed text or a text bubble of the already displayed text, or change a color of the already displayed text, or change a color of the text bubble of the already displayed text. Further, by way of example, if a region to be selected is overlapped in whole or in part with a text already displayed in the chatting area, the text display unit 202 may regularly make flicker of the already displayed text or a text bubble of the already displayed text, or change a color of the already displayed text, or change a color of the text bubble of the already displayed text.

As illustrated in FIG. 3, the position detection unit 204 detects position information of a region 441 selected through the user interface 206. In order to do so, the user may select a region by placing his/her finger 442 in a predetermined point region in the chatting area through a touch screen interface as the user interface 206. The position information may be position information of a point region directly specified by the user or position information of any one of at least two cell regions divided by the at least one dividing line 433.

The image display unit 205 displays the searched image data in a region corresponding to the detected position information. Herein, the detected position information refers to position information of a region selected through the user interface 206, and the region corresponding to the position information refers to a region for displaying image data. Therefore, generally, the region selected through the user interface 206 is distinguished from the region corresponding to the position information. By way of example, the region selected through the user interface 206 may be specified by a predetermined circular region in the chatting area, whereas the region corresponding to the position information may be specified by a predetermined square region specified by the center of the circular region, an x-axis distance of the image data, and a y-axis distance of the image data. However, according to another exemplary embodiment of the present disclosure, the region selected through the user interface 206 may be the same as the region corresponding to the position information.

A region where image data are displayed, i.e. a region corresponding to position information may be overlapped in whole or in part with a region where a text is displayed. In other words, the region where image data are displayed can be overlapped in whole or in part with the region where a text is displayed. Generally, a text is displayed in the chatting area by the text display unit 202, and image data are displayed in the chatting area by the image display unit 205, but may not be limited thereto.

If the text displayed in the chatting area is shifted in the chatting area, the displayed image data are also shifted in the chatting area. By way of example, if a first text to a seventh text are displayed in the chatting area and a first image is displayed in the chatting area and then, an eighth text is input through the user interface 206 or from the external device 30, the first text may be non-displayed in the chatting area and the second text to the seventh text may be shifted in an upward direction in the chatting area and the first image is also shifted in the upward direction in the chatting area. Further, the region where the first text to the eighth text are displayed is determined by a default value, whereas the region where the first image is displayed is randomly determined by the user interface 206. Herein, the first text to the eighth text are displayed, non-displayed, or shifted by the text display unit 202, and the image data may be displayed, non-displayed, or shifted by the image display unit 205. In order to do so, a control signal may be transmitted and received between the text display unit 202 and the image display unit 205. Generally, the first image may be a sticker-type image of which a location is determined by the user.

Referring to a reference numeral 45 of FIG. 3, the image display unit 205 displays the searched image data in a region 451 corresponding to the detected position information. Herein, the region 451 corresponding to the position information may be overlapped in whole with the region where the text 415 is displayed. In other words, the region 451 corresponding to the position information can cover the whole region where the text 415 is displayed.

Referring to FIG. 3, the text "No, I'm OK." 413 input through the user interface 206 is displayed in a region determined by a default value on the right side of the chatting area. Further, the text "No, I'm OK." 413 input through the user interface 206 is shifted from a first region determined by a default value on the right side of the chatting area to a second region (for example, above the first region) according to the progress of chatting. Likewise, the text "Are you busy?" 414 or "Lose some weight." 415 received from the external device 30 is displayed in a region determined by a default value on the left side of the chatting area and shifted from a third region determined by a default value to a fourth region (for example, above the third region) according to the progress of chatting. By contrast, image data may be displayed in the region 451 randomly determined by the user.

The image display unit 205 can shift the displayed image data. To be specific, if the position detection unit 204 receives a shift command of the displayed image data through the user interface 206 and detects position information of a destination region of the display image data on the basis of the shift command, the image display unit 205 may shift the display image data to a region corresponding to the detected position information of the destination region. According to an example of the shift command, the displayed image data are activated to be shiftable by the user and the activated image data are shifted by the user to the destination region. Herein, the displayed image data can be activated when the user touches a finger in the region for the displayed image data for several seconds.

The data communication unit 201 transmits image data and position information to the external device 30. Herein, if the image search unit 203 searches for image data of an image selected through the user interface 206 and the position detection unit 204 detects position information of a region selected through the user interface 206 in the chatting area, the data communication unit 201 may transmit the searched image data and the detected position information to the external device 30. Further, if the image display unit 205 displays the searched image data in a region corresponding to the detected position information, the data communication unit 201 may transmit the searched image data and the detected location formation to the external device 30. The external device 30 displays the received image data in a region corresponding to the detected position information in a chatting area of the external device 30.

The image display unit 205 displays external image data received from the external device 30. Herein, the data communication unit 201 may receive external image data and external position information from the external device 30, and the image display unit 205 may display the external image data in a region corresponding to the external position information in the chatting area. The external position information refers to position information of a region selected through a user interface of the external device 30. Generally, an external user may select a region by placing his/her finger in a predetermined point region in the chatting area through a touch screen interface as the user interface of the external device 30, or may select a region by moving his/her finger to specify a predetermined plane region formed into a circle, a triangle, or a square through the touch screen interface as the user interface of the external device 30. Further, the external position information may be an identification number for specifying each of multiple pixels by a single value, 2D coordinates including an x-axis location and a y-axis location, or 3D coordinates including x-axis, y-axis, and z-axis locations.

If the data communication unit 201 receives the external image data from the external device 30, the image display unit 205 may display a notice message for notifying a receipt of the external image data in the display of the device 20. Further, if the data communication unit 201 receives the external position information related to the external image data from the external device 30, the image display unit 205 may display a notice message for notifying a receipt of the external image data or the external position information in the display of the device 20.

Figure 4:
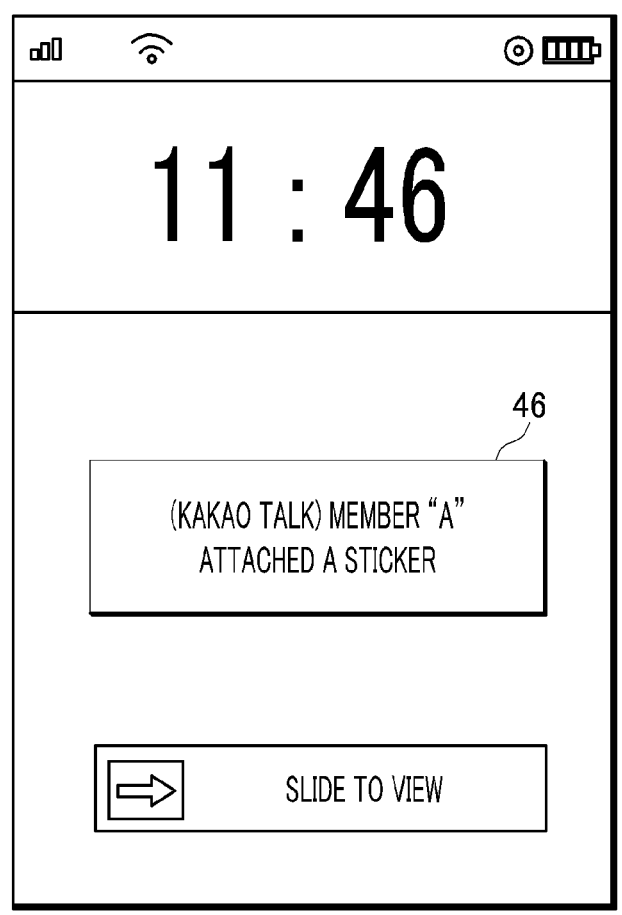
FIG. 4 is a diagram showing an example in which a notice message is displayed by an image display unit 205 of FIG. 2.

FIG. 4 is a diagram showing an example in which a notice message is displayed by the image display unit 205 of FIG. 2. Referring to FIG. 4, if the data communication unit 201 receives a sticker-type image as external image data from the external device 30 of a user A, the image display unit 205 may display a notice message "A attached a sticker." 46 for notifying a receipt of the sticker-type image from the user A in the display of the device 20. As illustrated in FIG. 4, the notice message may be displayed as a push message on a lock screen where the chatting area is not activated.

The user interface 206 refers to a tool or a device through which a control command is input by the user. The user interface 206 may be a physical input device such as a keyboard, a mouse, a touch screen, and the like, and may also be a graphical user interface (GUI) expressed in a video display device.

The user interface 206 may provide a tool for modifying image data displayed in the chatting area. By way of example, the user interface 206 may provide a graphic editing tool for modifying image data selected through the user interface 206 or image data received from the external device 30. Herein, the image data selected through the user interface 206 or the image data received from the external device 30 may be in the form of a sticker-type image.

The user interface 206 may provide a tool for generating image data. By way of example, the user interface 206 may provide a graphic editing tool for generating image data from an original image received from the outside, or may provide a graphic editing tool for generating image data from an image captured from the display of the device 20. Herein, the image data generated from the original image or the image data generated from the captured image may be in the form of a sticker-type image.

Figure 5:
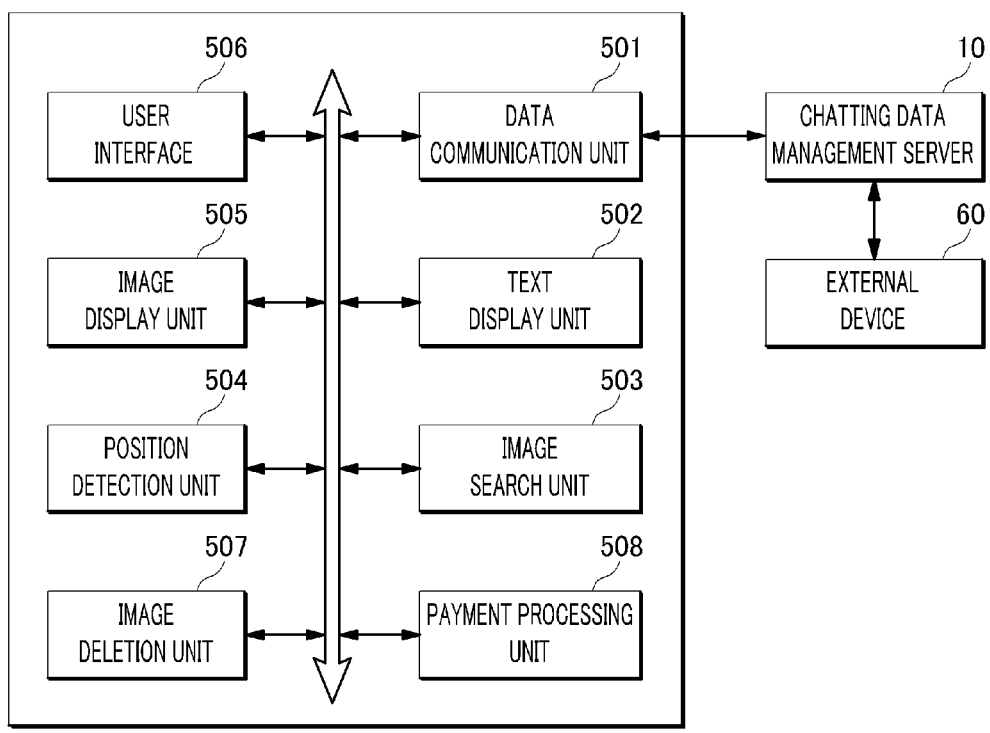
FIG. 5 is a configuration view of a device 50 according to another exemplary embodiment of the present disclosure.

FIG. 5 is a configuration view of a device 50 according to another exemplary embodiment of the present disclosure. The device 50 refers to any one of the devices 21 to 23 illustrated in FIG. 1, but may not be limited to the devices 21 to 23 illustrated in FIG. 1.

Referring to FIG. 5, the device 50 includes a data communication unit 501, a text display unit 502, an image search unit 503, a position detection unit 504, an image display unit 505, a user interface 506, an image deletion unit 507, and a payment processing unit 508. Among the components of the device 50, the data communication unit 501, the text display unit 502, the image search unit 503, the position detection unit 504, the image display unit 505, and the user interface 506 correspond to the data communication unit 201, the text display unit 202, the image search unit 203, the position detection unit 204, the image display unit 205, and the user interface 206, respectively. Therefore, the descriptions made above with respect to the data communication unit 201 to the user interface 206 of the device 20 illustrated in FIG. 2 can be respectively applied even to non-described matters of the data communication unit 501 to the user interface 506 of the device 50 illustrated in FIG. 5. Further, the descriptions made with respect to the data communication unit 501 to the user interface 506 of the device 50 illustrated in FIG. 5 can also be respectively applied to the data communication unit 201 to the user interface 206 of the device 20 illustrated in FIG. 2. Furthermore, the description made with respect to the external device 30 can be applied to the non-described matters of an external device 60, and the description made with respect to the external device 60 can also be applied to the device 30.

The device 50 illustrated in FIG. 5 is one exemplary embodiment of the present disclosure and can be modified or changed in various ways on the basis of the components illustrated in FIG. 5. By way of example, the device 50 may further include an audio output device that outputs audio and a display that outputs video.

The data communication unit 501 receives chatting data of the external device 60 via a network. Herein, the chatting data may include at least one of a text, image data, and position information related to the image data.

The text display unit 502 displays a text in a chatting area. Herein, the text may be a text received from the external device 60 or a text input through the user interface 506. The chatting area is an area displayed on a display of the device 50 as a graphic area for displaying a text input through the user interface 506 or received from the external device 60.

The image search unit 503 searches for image data of an image selected through the user interface 506. To be specific, if the image display unit 505 receives a command to call images through the user interface 506 and displays multiple images in a predetermined region of the display of the device 50, the image search unit 203 may search for image data of an image selected through the user interface 506 from the displayed multiple images.

The position detection unit 504 detects position information of the region selected through the user interface 506 in the chatting area. A user may select a region through the user interface 506.

The image display unit 505 displays the searched image data in a region corresponding to the detected position information. Herein, the detected position information refers to position information of a region selected through the user interface 506, and the region corresponding to the position information refers to a region for displaying image data. Therefore, generally, the region selected through the user interface 506 is distinguished from the region corresponding to the position information. However, according to another exemplary embodiment of the present disclosure, the region selected through the user interface 506 may be the same as the region corresponding to the position information.

The user interface 506 refers to a tool or a device through which a control command is input by the user. The user interface 506 may be a physical input device such as a keyboard, a mouse, a touch screen, and the like, and may also be a graphical user interface (GUI) expressed in a video display device.

If the region where the image data are displayed is selected through the user interface 506, the image deletion unit 507 may non-display the displayed image data. By way of example, if the user places his/her finger (for example, clicks or touches) on image data displayed on a touch screen as the user interface 506, the image deletion unit 507 may non-display the displayed image data. A selection of the region where the image data are displayed is one example of the user's command to instruct non-display of the displayed image data. Therefore, according to various exemplary embodiments of the present disclosure, the user's command to instruct non-display of image data may be the user selection of an icon displayed on the display or selection of a hardware button of the device 50. Further, according to another exemplary embodiment of the present disclosure, an operation of the image deletion unit 507 is performed by the image display unit 505.

Figure 6:
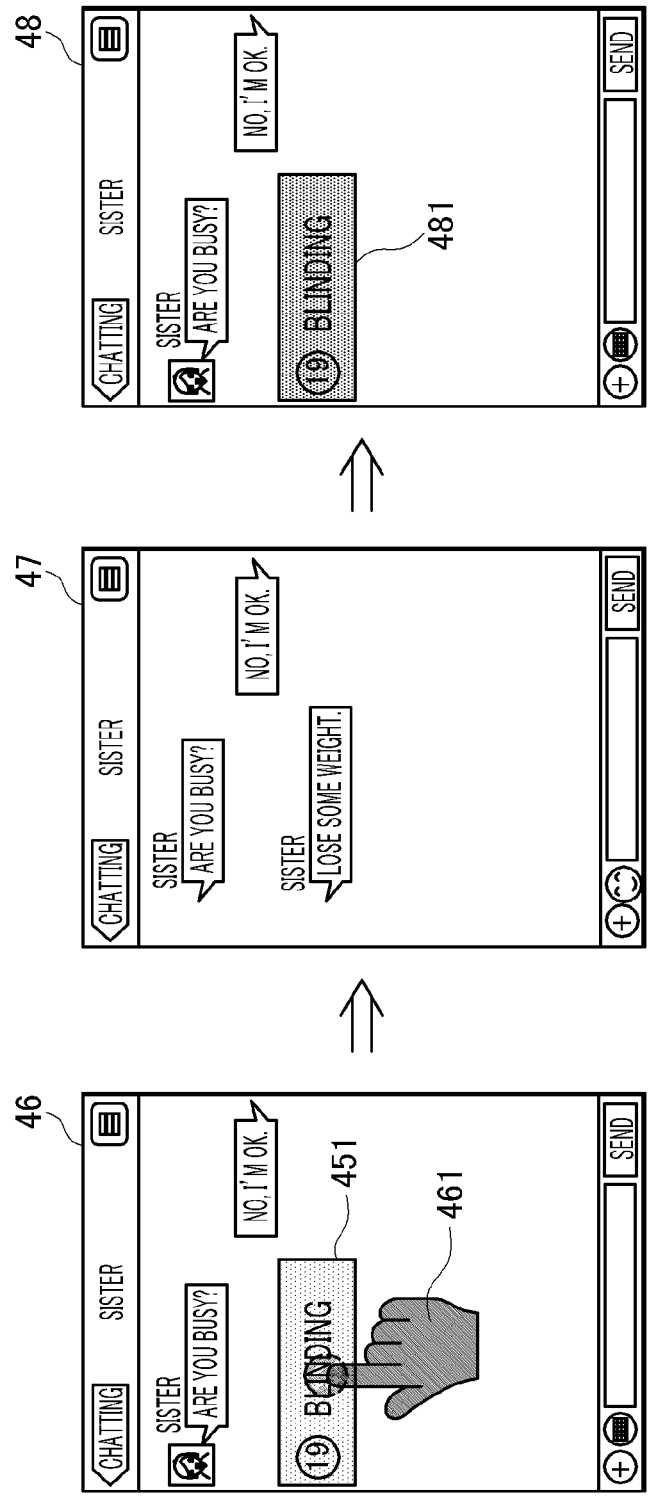
FIG. 6 is a diagram provided to explain an example of an operation of the device 50 of FIG. 5.

FIG. 6 is a diagram provided to explain an example of an operation of the device 50 of FIG. 5. Referring to reference numerals 46 and 47 of FIG. 6, the operation of the image deletion unit 507 will be described. If a finger 461 of the user is placed on displayed image data 451, the image deletion unit 507 may recognize that the finger 461 of the user is placed on the displayed image data, through the touch screen of the user interface 506 and non-display the displayed image data 451. The reference numeral 47 shows that the displayed image data are non-displayed. As illustrated in a reference numeral 48, if the user deactivates the chatting area and then activates the chatting area, the image display unit 505 may re-display the non-displayed image data 451. In other words, if the user gets out of the chatting area and gets into the chatting area again, the image display unit 505 may re-display the non-displayed image data 451.

If the image deletion unit 507 receives a command to non-display an image through the user interface 5065, the image deletion unit 507 may non-display at least one image data already displayed in the chatting area. Herein, the command to non-display an image may refer to a user's command to non-display all of at least one image data already displayed in the chatting area. An example of the command to non-display an image may include the user's selection of any one of at least one image data already displayed in the chatting area, selection of a non-display icon displayed on the display, or selection of a hardware non-display button of the device 50. According to another exemplary embodiment of the present disclosure, the operation of the image deletion unit 507 may be performed by the image display unit 505.

If the image deletion unit 507 non-displays the displayed image data, the data communication unit 501 may transmit a signal for notifying non-display of image data to the external device 60. Herein, the signal for notifying non-display may include identification information for identifying the non-displayed image data. The identification information may be position information of the non-displayed image data. The external device 60 may non-display at least one image data displayed on the external device 60 with reference to the signal for notifying non-display.

The payment processing unit 508 performs at least one payment process corresponding to image data. In an example of the payment process, image data are purchased and payment is made for the purchased image data. By way of example, according to the payment process, if the user inputs a request for purchasing image data through the user interface 506, a payment request message for requesting payment for the image data is transmitted from the device 50 to a payment server (not illustrated) or the chatting data management server 10, and a payment completion message is received from the payment server (not illustrated) or the chatting data management server 10.

Another example of the payment process may be a gifting process for giving image data to another user as a gift. By way of example, according to the gifting process, if the user inputs a request for giving image data to the external device 60 as a gift through the user interface 506, the device 50 transmits a payment request message for requesting payment for the image data to the payment server (not illustrated) or the chatting data management server 10, a payment completion message is received from the payment server (not illustrated) or the chatting data management server 10, and the image data are transmitted to the external device 60. According to various exemplary embodiments of the present disclosure, examples of the payment process can be determined in various ways.

Figure 7:
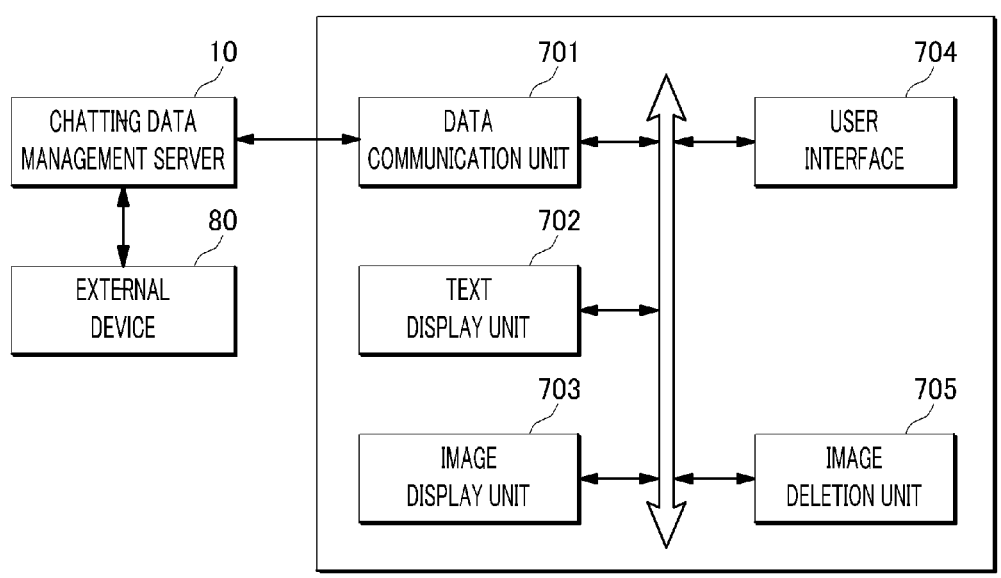
FIG. 7 is a configuration view of a device 70 according to yet another exemplary embodiment of the present disclosure.

FIG. 7 is a configuration view of a device 70 according to yet another exemplary embodiment of the present disclosure. The device 70 may refer to the external device 60 of FIG. 5, and an external device 80 may refer to the device 50 of FIG. 5. Therefore, the descriptions made above with respect to the device 30 illustrated in FIG. 2 or the device 60 illustrated in FIG. 5 can be applied even to non-described matters of the device 70 illustrated in FIG. 7.

Referring to FIG. 7, the device 70 includes a data communication unit 701, a text display unit 702, an image search unit 703, a user interface 704, and an image deletion unit 705. However, the device 70 illustrated in FIG. 7 is one exemplary embodiment of the present disclosure and can be modified or changed in various ways on the basis of the components illustrated in FIG. 7. By way of example, the device 70 may further include a component for performing an operation of the image search unit 503 of the device 50, a component for performing an operation of the position detection unit 504 of the device 50, and a component for performing an operation of the payment processing unit 508 of the device 50.

The device 70 may perform the operation of the device 20 or the device 50 at the same time when performing the operation of the device 60. Therefore, among the components of the device 70, the data communication unit 701, the text display unit 702, the image display unit 703, the user interface 704, and the image deletion unit 705 may perform the operations of the data communication unit 201, the text display unit 202, the image display unit 205, the user interface 206 of the device 20 or the operations of the data communication unit 501, the text display unit 502, the image display unit 505, the user interface 506, and the image deletion unit 507 of the device 50, respectively. Further, the device 70 may further include a component for performing an operation of the image search unit 203 or the image search unit 503, a component for performing an operation of the position detection unit 204 or the position detection unit 504, and a component for performing an operation of the payment processing unit 508 of the device 50.

The data communication unit 701 receives chatting data of the external device 80 via a network. Herein, the chatting data may include at least one of a text, image data, and position information related to the image data. Further, the data communication unit 701 may transmit chatting data to the external device 80 via the network.

The data communication unit 701 may receive chatting data from the external device 80 via the chatting data management server 10, or may directly receive chatting data from the external device 80 without passing through the chatting data management server 10. Further, the data communication unit 701 may transmit and receive information (for example, any one of identification information, selection information, or identification code) related to chatting data to/from the chatting data management server 10.

The text display unit 702 displays a text in a chatting area. Herein, the text may be a text received from the external device 80 or a text input through the user interface 704. The chatting area is an area displayed on a display of the device 70 as a graphic area for displaying a text input through the user interface 704 or received from the external device 80.

The image display unit 703 displays received image data in a region corresponding to received position information. Herein, if a displayed text is shifted in the chatting area, displayed image data may also be shifted in the chatting area. Further, the received position information refers to position information of a region selected through a user interface of the external device 80, and the region corresponding to position information refers to a region for displaying the received image data.

The user interface 704 refers to a tool or a device through which a control command is input by the user. The user interface 704 may be a physical input device such as a keyboard, a mouse, a touch screen, and the like, and may also be a graphical user interface (GUI) expressed in a video display device.

If the data communication unit 701 receives a signal for notifying non-display of image data transmitted from the external device 80, the image deletion unit 705 non-displays the displayed image data. Such an operation of the image deletion unit 705 may be performed by the image display unit 703.

Figure 8:
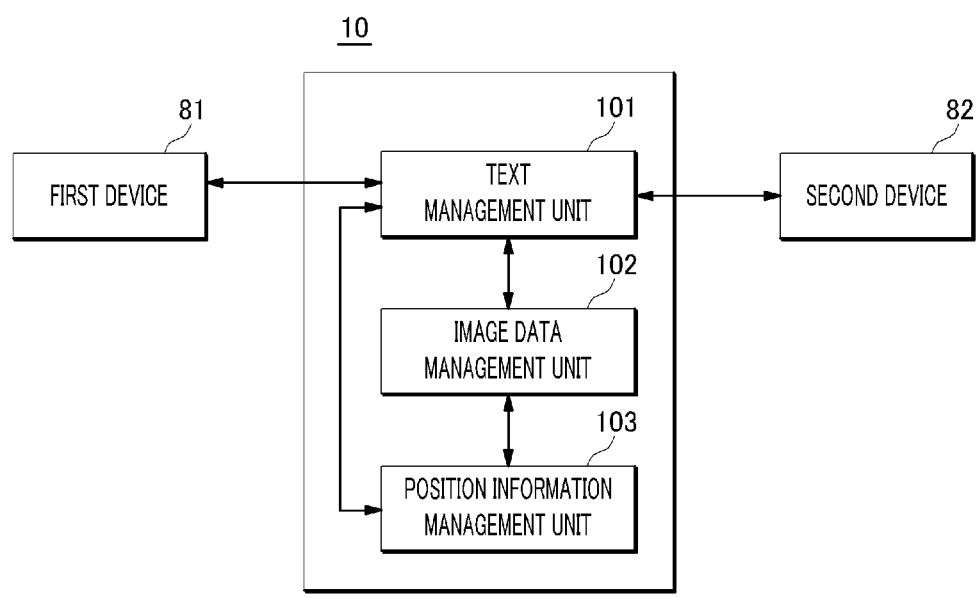
FIG. 8 is a configuration view of a chatting data management server 10 of FIG. 1.

FIG. 8 is a configuration view of the chatting data management server 10 of FIG. 1. Referring to FIG. 8, the chatting data management server 10 includes a text management unit 101, an image data management unit 102, and a position information management unit 103. However, the chatting data management server 10 illustrated in FIG. 8 is one exemplary embodiment of the present disclosure and can be modified or changed in various ways on the basis of the components illustrated in FIG. 8. By way of example, the chatting data management server 10 may further include a manager interface for controlling each component in the chatting data management server 10.

The text management unit 101 receives a text from a first device 81 among multiple devices connected via a network and transmits the received text to a second device 82. The image data management unit 102 receives image data from the first device 81 and transmits the received image data to the second device 82. Herein, the image data management unit 102 may receive information (for example, identification information or selection information) related to the image data from the first device 81 and transmit the image data to the second device 82 using the received information. Further, the image data management unit 102 may receive information (for example, identification information or selection information) related to the image data from the first device 81 and transmit the received information to the second device 82, and then, if the second device 82 requests image data, the image data management unit 102 may transmit the image data to the second device 82. The position information management unit 103 receives position information related to the image data from the first device 81 and transmits the received position information to the second device 82. Herein, the image data may be displayed in a region corresponding to the position information in a chatting area of the first device. Further, the image data may be displayed in a region corresponding to the position information in a chatting area of the second device.

Figure 9:
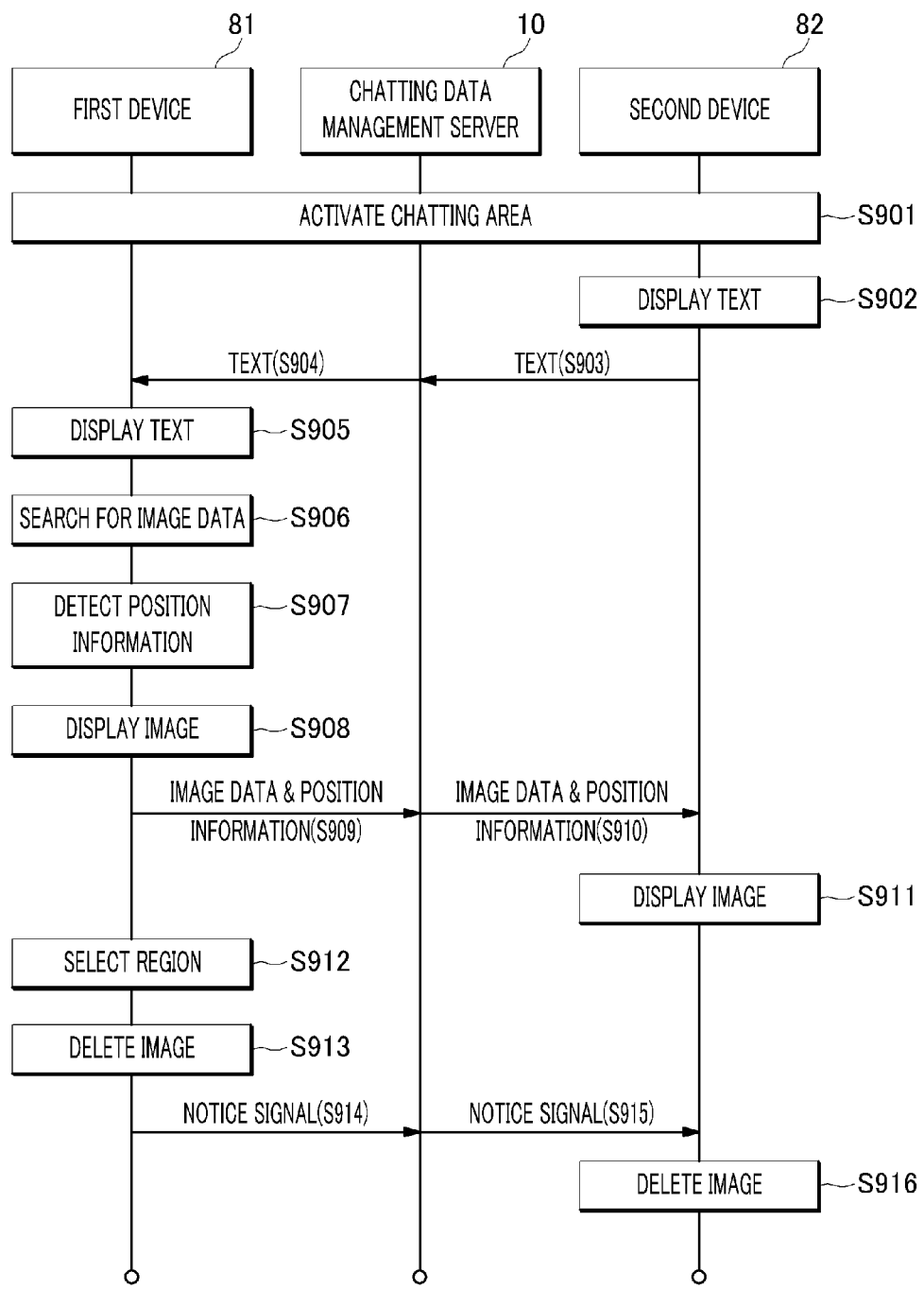
FIG. 9 is a diagram provided to explain an example of an operation of the chatting data management server 10 of FIG. 1.

FIG. 9 is a diagram provided to explain an example of an operation of the chatting data management server 10 of FIG. 1. An operation of the chatting data management server 10 of FIG. 9 is one of various exemplary embodiments of the present disclosure. Thus, all of the exemplary embodiments of the present disclosure are not limited to FIG. 9 and the description thereof.

In block S901, a chatting area of the first device 81 and a chatting area of the second device 82 are activated. In order to do so, the chatting data management server 10 may transmit and receive a signal for activating the chatting areas of the first device 81 and the second device 82. By way of example, the chatting data management server 10 may receive a request for chatting from the first device 81 or the second device 82 and transmit a response for activating a chatting area to the first device 81 and the second device 82 in response to the received request for chatting.

If the second device 82 displays a text input by a user in the chatting area of the second device 82 (S902) and the second device 82 transmits the displayed text to the chatting data management server 10 (S903), the chatting data management server 10 transmits the text received from the second device 82 to the first device 81 (S904).

The first device 81 displays the text received from the chatting data management server 10 in the chatting area of the first device (S905), searches image data of an image selected through a user interface of the first device 81 (S906), detects position information of a region selected through the user interface of the first device 81 (S907), displays the searched image data in a region corresponding to the position information (S908), and transmits the searched image data and the detected position information to the chatting data management server 10 (S909).

The chatting data management server 10 receives image data (or information of the image data) and position information related to the image data from the first device 81 (S909) and transmits the received image data (or information of the image data) and the received position information to the second device 82 (S910). The second device 82 displays the received image data in a region corresponding to the received position information (S911).

If the first device 81 receives an input of a selection of displayed image data through the user interface of the first device 81 (S912), the first device 81 non-displays the image data in the chatting area of the first device 81 (S913) and transmits a notice signal for notifying non-display of the image data to the chatting data management server 10 (S914).

The chatting data management server 10 receives the notice signal for notifying non-display of the image data from the first device 81 (S914) and transmits the received notice signal to the second device 82 (S915). The second device 82 non-displays the image displayed in the chatting area of the second device 82 on the basis of the received notice signal.

Non-described matters about the chatting data management server 10 with reference to FIG. 8 and FIG. 9 are the same as the descriptions made with respect to the chatting data management server 10 with reference to FIG. 1 to FIG. 7 or can be easily inferred from the descriptions, and, thus, explanation thereof will be omitted and the descriptions with reference to FIG. 1 to FIG. 7 are applied thereto. Herein, each of the first device 81 or the second device 82 of FIG. 8 may be any one of the devices 21 to 23, the device 20, the device 30, the device 50, the device 60, the device 70, or the device 80 described with reference to FIG. 1 to FIG. 7.

Figure 10:
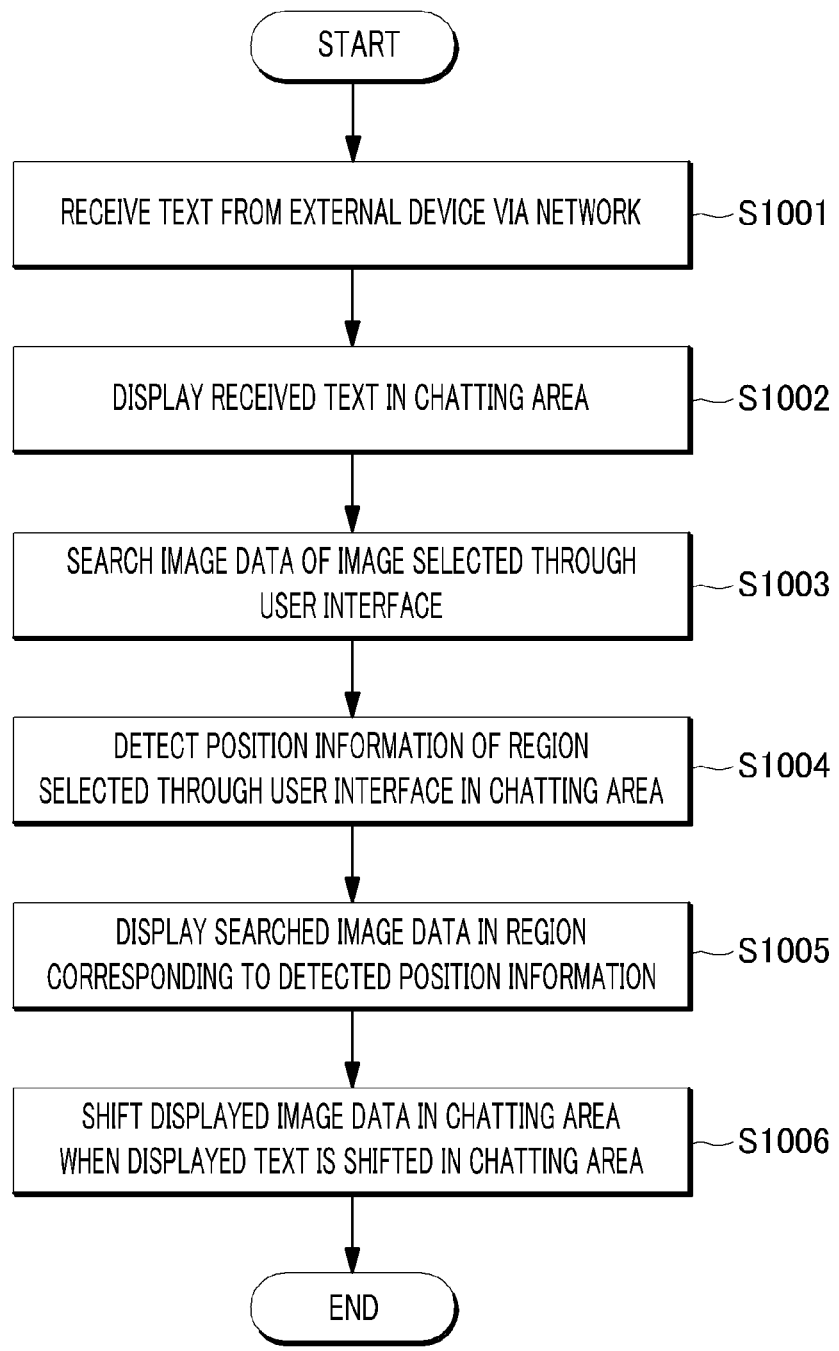
FIG. 10 is a flowchart of a method for displaying an image according to an exemplary embodiment of the present disclosure.

FIG. 10 is a flowchart of a method for displaying an image according to an exemplary embodiment of the present disclosure. The method for displaying an image according to an exemplary embodiment illustrated in FIG. 10 includes steps performed time sequentially in the device 50 according to the exemplary embodiment illustrated in FIG. 5 or the device 50 according to the exemplary embodiment illustrated in FIG. 5. Therefore, even if omitted in the following, the descriptions made above with respect to the device 20 according to the exemplary embodiment illustrated in FIG. 2 or the device 50 according to the exemplary embodiment illustrated in FIG. 5 can be applied to the method for displaying an image according to the exemplary embodiment illustrated in FIG. 10. Hereinafter, it will be described that the steps are performed by the respective components of the device 50 illustrated in FIG. 5 for convenience in explanation, but the steps may also be performed by the respective components of the device 20 illustrated in FIG. 2.

In block S1001, the data communication unit 501 receives a text from the external device via the network. In block S1002, the text display unit 502 displays the received text in the chatting area. In block S1003, the image search unit 503 searches for image data of an image selected through the user interface 506. In block S1004, the position detection unit 504 detects position information of a region selected through the user interface 506 in the chatting area. In block S1005, the image display unit 507 displays the searched image data in a region corresponding to the detected position information. In block S1006, if the displayed text is shifted in the chatting area, the image display unit 505 shifts the displayed image data in the chatting area.

Although not illustrated in FIG. 10, the method for displaying an image may further include a step of non-displaying the displayed image data if a region where the image data are displayed is selected through the user interface 506(not illustrated), a step of displaying a notice message for notifying receipt of external image data by the data communication unit in the display of the device (not illustrated), and a step of performing at least one payment process corresponding to the image data.

Figure 11:
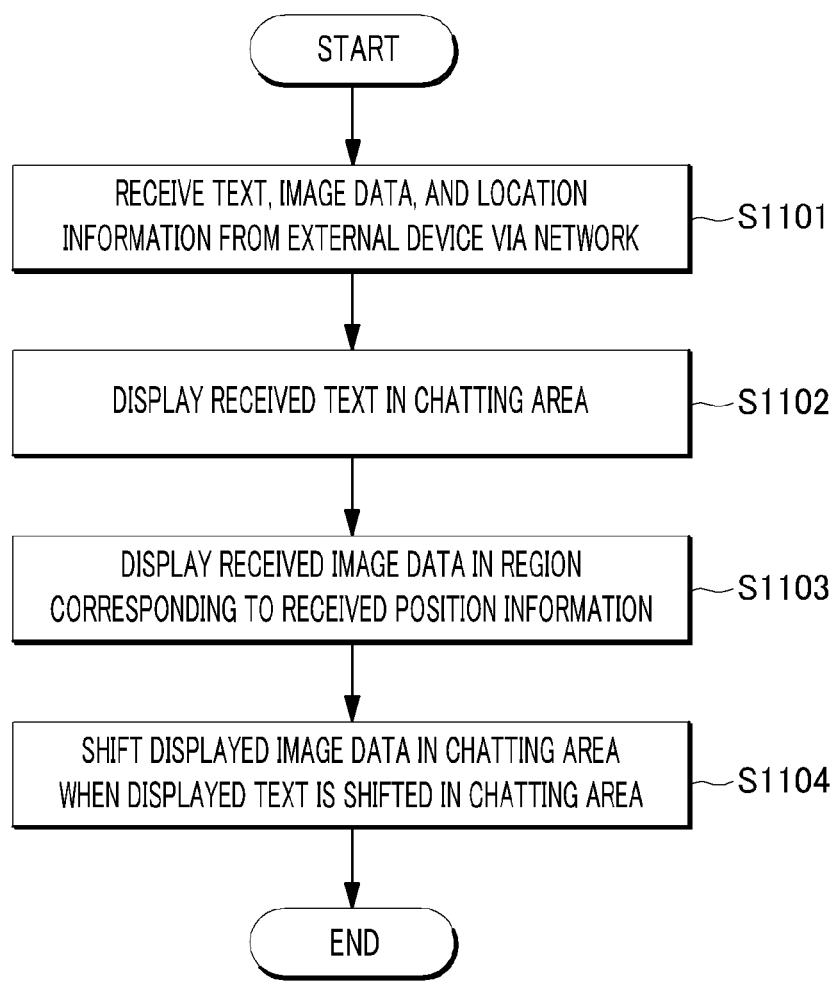
FIG. 11 is a flowchart of a method for displaying an image according to another exemplary embodiment of the present disclosure.

FIG. 11 is a flowchart of a method for displaying an image according to another exemplary embodiment of the present disclosure. The method for displaying an image according to an exemplary embodiment illustrated in FIG. 11 includes steps performed time sequentially in the device 70 according to the exemplary embodiment illustrated in FIG. 7. Therefore, even if omitted in the following, the descriptions made above with respect to the device 70 according to the exemplary embodiment illustrated in FIG. 7 can be applied to the method for displaying an image according to the exemplary embodiment illustrated in FIG. 11.

In block S1101, the data communication unit 701 receives a text, image data, and position information from the external device 80 via the network. In block S1102, the text display unit 702 displays the received text in the chatting area. In block S1103, the image display unit 703 displays the received image data in a region corresponding to the received position information. In block S1104, if the displayed text is shifted in the chatting area, the image display unit 703 shifts the displayed image data in the chatting area.

Although not illustrated in FIG. 11, if the data communication unit 701 receives a signal for notifying non-display of the image data transmitted from the external device 80, the method for displaying an image may further include a step of non-displaying the displayed image data (not illustrated).

FIG. 12 is a flowchart of a method for managing chatting data according to an exemplary embodiment of the present disclosure. The method for managing chatting data according to an exemplary embodiment illustrated in FIG. 12 includes steps performed time sequentially in the chatting data management server 10 according to the exemplary embodiment illustrated in FIG. 8. Therefore, even if omitted in the following, the descriptions made above with respect to the chatting data management server 10 according to the exemplary embodiment illustrated in FIG. 8 can be applied to the method for managing chatting data according to the exemplary embodiment illustrated in FIG. 12.

In block S1201, the text management unit 101 receives a text from the first device 81 among the multiple devices connected via the network and transmits the received text to the second device 82. In block S1202, the image data management unit 102 receives information of image data (or image data) from the first device 81 and transmits the received information of the image data (or image data) to the second device 82. The position information management unit (103) receives position information related to the image data from the first device 81 and transmits the received position information to the second device 82. Herein, the image data may be displayed in a region corresponding to the position information in the chatting area of the second device 82. Further, the image data may be displayed in a region corresponding to the position information in the chatting area of the first device 81.

The method for displaying an image or the method for managing chatting data described above with reference to FIGS. 10 and 11 or FIG. 12, respectively, can be embodied in a storage medium including instruction codes executable by a computer such as a program module executed by the computer. Besides, the data structure in accordance with the embodiment of the present disclosure can be stored in the storage medium executable by the computer. A computer readable medium can be any usable medium which can be accessed by the computer and includes all volatile/non-volatile and removable/non-removable media. Further, the computer readable medium may include all computer storage and communication media. The computer storage medium includes all volatile/non-volatile and removable/non-removable media embodied by a certain method or technology for storing information such as computer readable instruction code, a data structure, a program module or other data. The communication medium typically includes the computer readable instruction code, the data structure, the program module, or other data of a modulated data signal such as a carrier wave, or other transmission mechanism, and includes a certain information transmission medium.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

I claim:

1. A device that displays an image in a chatting area where a text is displayed, the device comprising:
   a data communication unit that receives a text from an external device via a network;
   a text display unit that displays the received text in the chatting area;
   an image search unit that searches for image data of an image selected through a user interface;
   a position detection unit that detects position information of a region selected through the user interface in the chatting area; and
   an image display unit that displays the searched image data in a region corresponding to the detected position information,
   wherein when the displayed text is shifted in the chatting area, the displayed image data are also shifted in the chatting area, and
   wherein the region where the image data are displayed is a region where the text is displayed and the image data are overlapped in whole or in part with the text.

2. The device of claim 1, further comprising:
   an image deletion unit that non-displays the displayed image data when the region where the image data are displayed is selected through the user interface.

3. The device of claim 2, wherein when the image deletion unit non-displays the displayed image data, the data communication unit transmits a signal for notifying non-display of the image data to the external device.

4. The device of claim 1, wherein when the region selected through the user interface is in a predetermined distance range from the displayed text, the text display unit emphasizes the displayed text.

5. The device of claim 1,
   wherein when the position detection unit receives a shift command of the displayed image data through the user interface, the position detection unit detects position information of a destination region of the display image data on the basis of the shift command, and
   the image display unit shifts the displayed image data to a region corresponding to the detected position information of the destination region and displays the image data on the destination region.

6. The device of claim 1, further comprising:
   an image deletion unit that non-displays at least one image data already displayed in the chatting area when a command to non-display an image is input through the user interface.

7. The device of claim 1,
   wherein the chatting area is divided into at least two cell regions by at least one dividing line, and
   the selected region is any one cell region selected through the user interface from the at least two cell regions divided by the at least one dividing line.

8. The device of claim 1, wherein the user interface provides a user with a list of multiple images arranged in used order.

9. The device of claim 1, wherein the user interface provides a tool for modifying the image data.

10. The device of claim 1, wherein when the data communication unit receives external image data and external position information from the external device, the image display unit displays the external image data in a region corresponding to the external position information in the chatting area.

11. The device of claim 10, wherein when the data communication unit receives the external image data, the image display unit displays a notice message for notifying receipt of the external image data on a display of the device.

12. The device of claim 1, further comprising:
    a payment processing unit that performs at least one payment process related to the image data.

13. A server that manages chatting data, the server comprising:
    a text management unit that receives a text from a first device and transmits the received text to a second device from among multiple devices connected via a network;
    an image data management unit that receives information of image data from the first device and transmits the received information of the image data to the second device; and
    a position information management unit that receives position information related to the image data from the first device and transmits the received position information to the second device,
    wherein the image data are displayed in a region corresponding to the position information in the chatting area of the second device, and
    wherein the region where the image data are displayed is a region where the text is displayed and the image data are overlapped in whole or in part with the text.

14. A device that transmits and receives a chatting message, the device comprising:
    a data communication unit that receives a text from an external device via a network;
    a text display unit that displays a text bubble of the received text in a chatting area;
    a position detection unit that detects position information of the text bubble selected through the user interface in the chatting area; and
    an image display unit that makes the text bubble corresponding to the detected position information blinded,
    wherein when the received text is shifted in the chatting area, the text bubble is also shifted in the chatting area while keeping the text bubble blinded.

15. The device of claim 14, wherein when the image display unit makes the text bubble blinded, the data communication unit transmits the position information of the text bubble to a chatting data management server or the external device.

16. The device of claim 15, wherein when the data communication unit receives an external position information of a text bubble of the external device, the image display unit makes a text bubble corresponding to the external position information blinded.

17. A method for transmitting and receiving a chatting message, the method comprising:
    receiving a text from an external device via a network;
    displaying a text bubble of the received text in a chatting area;
    detecting position information of the text bubble selected through the user interface in the chatting area; and
    making the text bubble corresponding to the detected position information blinded,
    wherein when the received text is shifted in the chatting area, the text bubble is also shifted in the chatting area while keeping the text bubble blinded.

* * * * *